(12) United States Patent
Hendry et al.

(10) Patent No.: US 9,381,807 B2
(45) Date of Patent: Jul. 5, 2016

(54) ELECTRONIC SHIFTER LIMP-HOME TECHNIQUES

(71) Applicants: Jeffrey C Hendry, Waterford, MI (US); Michael Mashkevich, West Bloomfield, MI (US); Eugene Karpinsky, Farmington Hills, MI (US)

(72) Inventors: Jeffrey C Hendry, Waterford, MI (US); Michael Mashkevich, West Bloomfield, MI (US); Eugene Karpinsky, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 128 days.

(21) Appl. No.: 14/275,081

(22) Filed: May 12, 2014

(65) Prior Publication Data

US 2015/0321551 A1    Nov. 12, 2015

(51) Int. Cl.
| | |
|---|---|
| *B60K 20/06* | (2006.01) |
| *B62D 1/04* | (2006.01) |
| *F16H 59/08* | (2006.01) |
| *F16H 61/12* | (2010.01) |
| *F16H 59/02* | (2006.01) |

(52) U.S. Cl.
CPC .............. *B60K 20/06* (2013.01); *B62D 1/046* (2013.01); *F16H 59/08* (2013.01); *F16H 61/12* (2013.01); *F16H 2059/0243* (2013.01); *F16H 2061/122* (2013.01); *F16H 2061/1216* (2013.01)

(58) Field of Classification Search
None
See application file for complete search history.

(56) References Cited

U.S. PATENT DOCUMENTS

| | | | | |
|---|---|---|---|---|
| 6,170,596 | B1 * | 1/2001 | Triarsi ................... | B60K 20/06 180/291 |
| 7,278,510 | B1 * | 10/2007 | Richards ................ | B62D 1/046 180/336 |
| 8,386,141 | B2 | 2/2013 | Tanaka et al. | |
| 8,437,930 | B2 | 5/2013 | Park | |
| 2012/0131993 | A1 | 5/2012 | Deurloo et al. | |
| 2012/0232765 | A1 | 9/2012 | Holub et al. | |
| 2013/0252784 | A1 | 9/2013 | Kinoshita et al. | |

FOREIGN PATENT DOCUMENTS

| | | |
|---|---|---|
| DE | 102006010909 A1 | 9/2007 |
| GB | 2423800 | 9/2006 |

OTHER PUBLICATIONS

International Search Report and Written Opinion dated Jul. 30, 2015 for International Application No. PCT/US2015/030110, International Filing Date May 11, 2015.

* cited by examiner

*Primary Examiner* — Edwin A Young
(74) *Attorney, Agent, or Firm* — Ralph E. Smith

(57) ABSTRACT

Limp-home techniques for situations when an electronic shifter of a vehicle malfunctions include detecting, at a controller of the vehicle, a malfunction of the electronic shifter of the vehicle, the electronic shifter being configured to control shifting of a transmission of the vehicle in response to a gear control input provided by operation of the electronic shifter. The techniques include, in response to detecting the malfunction of the electronic shifter, receiving, at the controller, the gear control input from actuation of the one or more actuators of a steering wheel of the vehicle. The techniques also include controlling, by the controller, shifting of the transmission in response to the gear control input received from the one or more actuators of the steering wheel.

12 Claims, 4 Drawing Sheets

ELECTRONIC SHIFTER LIMP-HOME TECHNIQUES

FIELD

The present disclosure relates generally to vehicle transmissions and, more particularly, to limp-home techniques for vehicles having electronic shifters.

BACKGROUND

An electronic shifter for a transmission of a vehicle, also known as a "shift-by-wire" system, receives a gear control input from a driver, which is used, e.g., by a controller, to electronically control the transmission to shift to a desired gear specified by the gear control input. Because there is no mechanical linkage between the electronic shifter and the transmission, the position of the electronic shifter must be known at all times. Faults or malfunctions of the electronic shifter could potentially occur due to unplugged connectors, blown fuses, or any loss of communication between the controller and the electronic shifter. In these situations, conventional electronic shifter systems command the transmission to a park gear until the fault or malfunction is no longer present (also known as "park lock"). While mechanical release systems exist, these systems disengage the park lock and transition the transmission into a neutral gear. The vehicle, however, although moveable (pushable), is still not driveable, i.e., the transmission is not able to be shifted into drive. Thus, while conventional electronic shifter systems work for their intended purpose, there remains a need for improvement in the relevant art.

SUMMARY

In one aspect, a vehicle is provided in accordance with the teachings of the present disclosure. In an exemplary implementation, the vehicle includes an electronic shifter configured to electronically control shifting of a transmission in response to a gear control input provided by operation of the electronic shifter. The vehicle includes a steering wheel (i) configured to control steering of the vehicle and (ii) having one or more actuators associated with one or more vehicle systems other than the transmission in a non-malfunction state of the electronic shifter. The vehicle also includes a controller configured to; detect a malfunction of the electronic shifter; in response to detecting the malfunction of the electronic shifter, receive the gear control input from the one or more actuators of the steering wheel; and control shifting of the transmission in response to the gear control input received from the one or more actuators of the steering wheel.

In another aspect, a method is provided in accordance with the teachings of the present disclosure. In an exemplary implementation, the method includes detecting, at a controller of a vehicle, a malfunction of an electronic shifter of the vehicle, the electronic shifter being configured to control shifting of a transmission of the vehicle in response to a gear control input provided by operation of the electronic shifter. The method includes, in response to detecting the malfunction of the electronic shifter, receiving, at the controller, the gear control input from the driver of the vehicle via one or more actuators of a steering wheel of the vehicle. The one or more actuators are associated with one or more vehicle systems other than the transmission in a non-malfunction state of the electronic shifter. The method also includes controlling, by the controller, shifting of the transmission in response to the gear control input received from the one or more actuators of the steering wheel.

In some implementations, the controller detects the malfunction of the electronic shifter when there is a loss of communication between the controller and the electronic shifter.

In some implementations, the vehicle includes a display configured to display information, and controller is further configured to control the display to output driver assist information that is adapted to assist a driver in providing the gear control input via the one or more actuators of the steering wheel. In some implementations, the driver assist information includes at least one of (i) a current gear of the transmission and (ii) how each actuator of the steering wheel is configured to control various gears of the transmission. In some implementations, the display is an in-dash display. In other implementations, the display is a center console display.

In some implementations, the controller is further configured to override the association of the one or more actuators with the one or more vehicle systems other than the transmission upon detecting the malfunction of the electronic shifter. In some implementations, the other system is an infotainment system of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, there remains a need for improvement in the relevant art of electronic shifter systems. More particularly, there remains a need to be able to at least temporarily drive a vehicle, i.e., "limp-home," after a fault or malfunction of the electronic shifter. Accordingly, limp-home techniques for a malfunctioning or faulted electronic shifter are presented. It will be appreciated that the term "electronic shifter" as used herein refers to any suitable "shift-by-wire" system in which a gear of a transmission is electronically controlled, such as in response to a gear control input via a shift lever. It will also be appreciated that the term "malfunction" refers to any fault, flag, or failure detected by a controller and indicating that the electronic shifter should not be used for shifting a gear of a transmission (unplugged connector, blown fuse, loss of communication, etc.). For example only, the malfunction could be a malfunction internal to the electronic shifter and could then be detected by the controller.

The techniques include detecting, at the controller, the malfunction of the electronic shifter. In response to detecting the malfunction of the electronic shifter, the controller receives a gear control input from the driver of the vehicle via one or more actuators ("actuators") of a steering wheel of the vehicle. These actuators are typically configured to control other operating parameters of another system the vehicle, such as operating parameters of an entertainment system, a hands-free telephone system, a navigation system, an in-dash information system, and the like. In other words, the controller overrides the other system associated with the actuators. In one exemplary implementation, the controller outputs driver assist information to a display (an in-dash display, a center console display, etc.) to assist the driver in providing the gear control input via the actuators. The controller then shifts the transmission in response to the gear control input.

In one exemplary implementation, the one or more actuators are not located on the steering wheel, but instead are located elsewhere in the vehicle. For example only, radio or navigation actuators could be overridden and utilized to provide the gear control input, with or without driver assist information displayed to the driver. In another exemplary implementation, new standalone actuators could be implemented for this purpose, but this would likely increase costs. The actuator(s) on the steering wheel, however, could be ideal because the driver is able to maintain their hands on the wheel. Similarly, the in-dash display could be ideal because the driver is able to maintain their focus on the dashboard and the road just above the dashboard, which is similar to typical driving.

Figure 1:
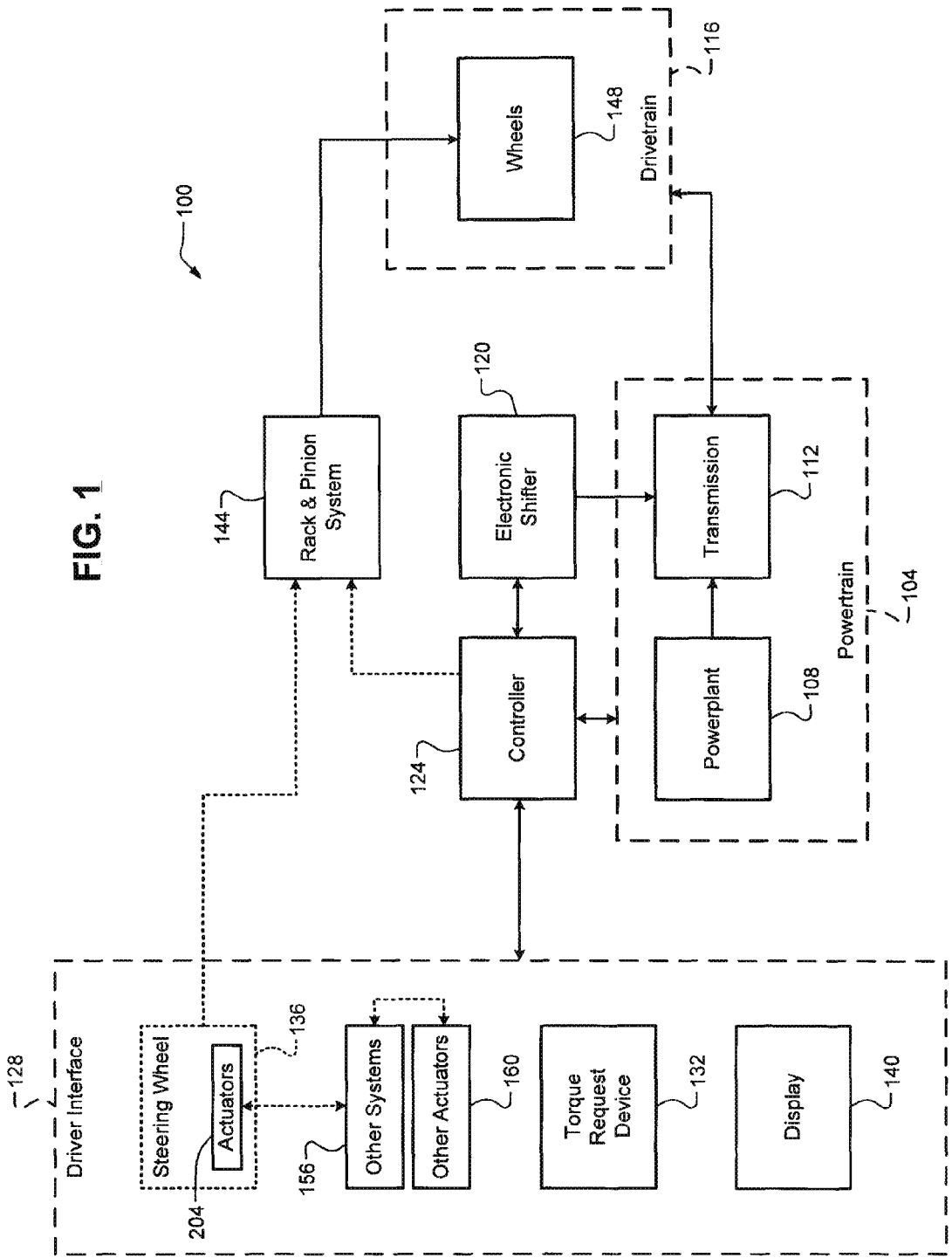
FIG. 1 is an example functional block diagram of a vehicle according to the principles of the present disclosure.

Referring now to FIG. 1, an example functional block diagram of a vehicle 100 is illustrated. The vehicle 100 includes a powertrain 104 including a powerplant 108 that generates drive torque and a transmission 112 that transfers the drive torque to a drivetrain 116 of the vehicle 100. Examples of the powerplant 108 include an engine (spark ignition, diesel, homogeneous charge compression ignition (HCCI), etc.), an electric motor, a battery system, or a combination thereof. The transmission 112 is any suitable automatic transmission configured to be controlled by an electronic shifter 120. The electronic shifter 120 is configured to receive a gear control input from a driver of the vehicle 100 and to electronically control a gear of the transmission 112 in response to the gear control input. The transmission 112 and the electronic shifter 120 are also referred to as a "shift-by-wire" system.

A controller 124 controls operation of the vehicle 100. It will be appreciated that the term "controller" as used herein refers to any suitable controller, module and/or computing device having one or more processors. The controller 124 receives the gear control input from the electronic shifter 120 and controls the transmission 112 accordingly. The controller 124 also receives other input from the driver via a driver interface 128. The driver interface 128 includes a torque request device 132, e.g., an accelerator pedal, a steering wheel 136, and a display 140. It will be appreciated that the driver interface 128 could include other suitable components, such as gauges. Steering input from the driver via the steering wheel is communicated to a rack and pinion system 144 either directly or optionally via the controller 124 (also known as "drive-by-wire"). The rack and pinion system 144 controls wheels 148 of the vehicle 100, e.g., part of the drivetrain 116, to adjust steering of the vehicle 100.

The steering wheel 136 includes one or more actuators 204 ("actuators 204"). The driver interface 128 also includes one or more other systems 156 ("other systems 156") and one or more other actuators 160 ("other actuators 160"). The actuators 204 are associated with the other systems 156 of the vehicle 100. Examples of the other systems 156 include an entertainment or infotainment system, a hands-free telephone system, a navigation system, and an in-dash information system. For example only, the actuators 204 could be used to control a volume of the entertainment system. The other actuators 160 may also be associated with the other systems 156, other devices of the vehicle 100, or could be standalone actuators for the limp-home techniques of the present disclosure. In one exemplary implementation, therefore, these other actuators 160 could be used instead of the actuators 204 of the steering wheel 136.

In one exemplary implementation, the vehicle 100 includes separate controllers (not shown) each configured for different functions. For example only, the vehicle 100 could include (i) a transmission controller that controls shifting of the transmission 112 and that handles the gear control input via the electronic shifter and (ii) a steering wheel controller that handles input via the actuators 204. In this example, the transmission controller could intercept (e.g., en route to the other systems 156, such as an entertainment or infotainment system) or directly receive messages the steering wheel controller, and the transmission controller could then interpret the messages according to a unique set of rules corresponding to the gear control strategy of the present disclosure. The transmission controller could also be configured to control when these limp-home techniques could be used, as well as inform other components, e.g., clusters/switches, when the limp-home techniques are active.

Figure 2:
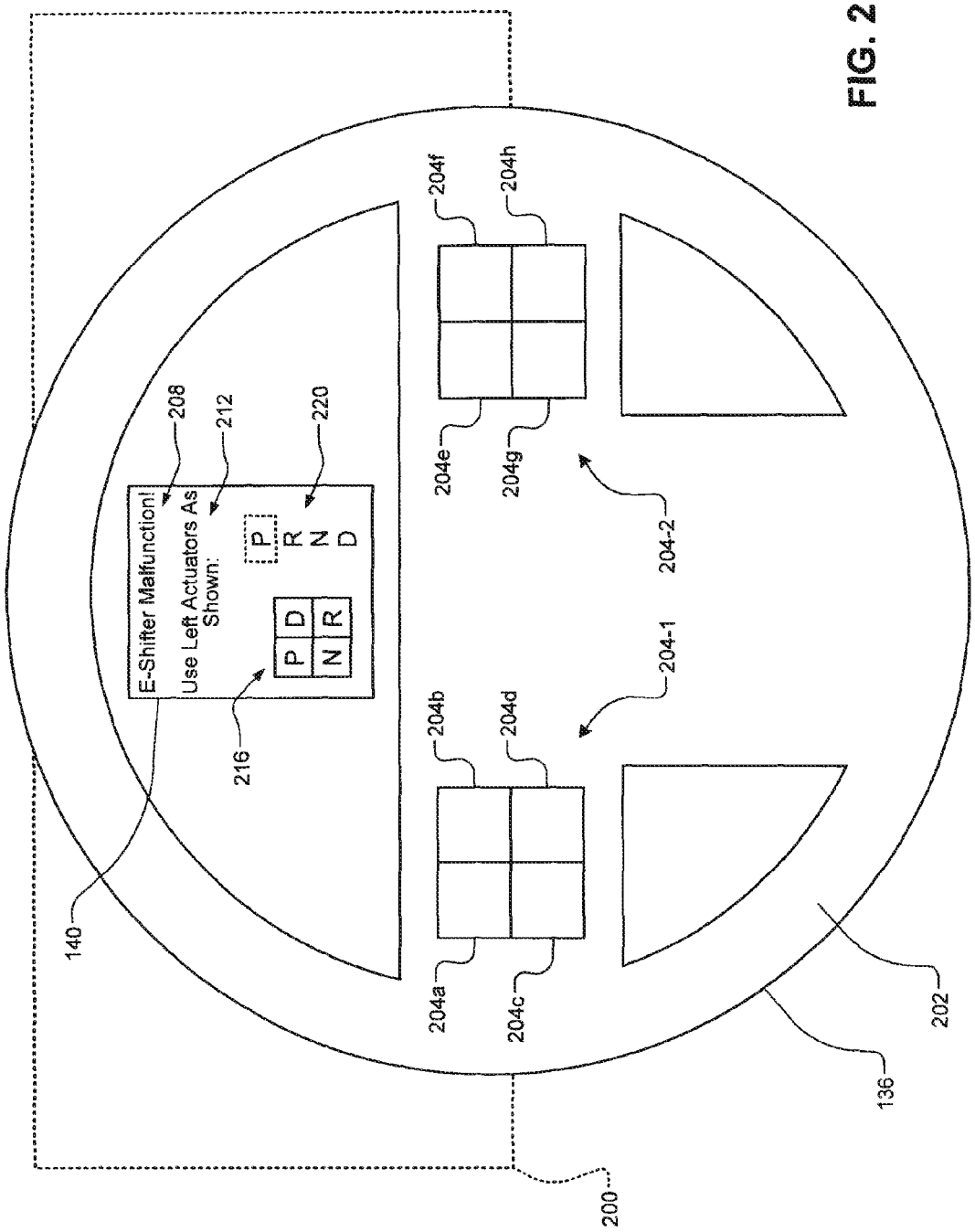
FIG. 2 is an example schematic diagram of a steering wheel and an in-dash display according to the principles of the present disclosure.

Referring now to FIG. 2, an example schematic of the steering wheel 136 and the display 140 from a perspective of the driver is illustrated. The steering wheel 136 is arranged proximate to a dashboard console or instrument panel 200 of the vehicle 100. The display 140 is incorporated into the dashboard console 200 (also known as an "in-dash display"). The dashboard console 200 could also include other components (not shown) such as gauges (vehicle speed, engine speed, engine temperature, fuel quantity, etc.). It will be appreciated that the display 140 could also be another suitable display configured to convey driver assist information to the driver of the vehicle 100 (a center console display, a radio display, a navigation display, a display incorporated into a rear-view mirror, a heads-up display, etc.).

In one exemplary implementation, a front side 202 of the steering wheel 136 includes two sets of actuators 204-1 and 204-2. In this exemplary implementation, the left set of actuators 204-1 includes four actuators 204a, 204b, 204c, and 204d. Similarly, the right set of actuators 204-2 includes four actuators 204e, 204f, 204g, and 204h. In one exemplary implementation, the left set of actuators 204-1 are configured to be actuated by a left thumb finger of the driver and the right set of actuators 204-2 are configured to be actuated by a right thumb finger of the driver while maintaining his/her hands on the steering wheel 136. All of these actuators are collectively referred to as the actuators 204. It will be appreciated that the steering wheel 136 could also include actuators in other suitable arrangements, such as on a back side of the steering wheel 136. Examples of the actuators 204 include single push buttons and two-way buttons, e.g., up/down. The actuators 204 are typically associated with operating parameters the other systems 156 of the vehicle 100, such as an entertainment or infotainment system. For example only, the actuators 204 could be used to control a volume of the entertainment system.

When the controller 124 detects a malfunction of the electronic shifter 120, the controller 124 receives the gear control input from the driver via the actuators 204. In some exemplary implementations, the controller 124 outputs driver assist information at the display 140. The driver assist information is intended to assist (e.g., instruct) the driver in providing the gear control input via the actuators 204. As shown, the driver assist information includes a malfunction message 208 ("E-Shifter Malfunction!"), instructions 212 ("Use Left Actuators As Shown:"), a diagram 216 illustrating how the actuators 204 are to be used to provide the gear control input, and a current gear indicator 220. It will be appreciated that less/more or other driver assist information could be provided.

As shown, actuator 204a corresponds to a park gear of the transmission 112, actuator 204b corresponds to a drive gear of the transmission 112, actuator 204c corresponds to a neutral gear of the transmission 112, and actuator 204d corresponds to a reverse gear of the transmission 112. By using the actuators 204 to provide the gear control input, the driver is able to control the gear of the transmission 112, and thus is able to "limp-home" until their vehicle 100 is serviced to remedy the malfunction of the electronic shifter 120. In one exemplary implementation, the steering wheel 136 could include a single actuator 204, and the single actuator 204 could be used to provide the gear control input by cycling between the gears of the transmission, such as P→R→N→D→P and so on. In this case, however, the driver assist information would be even more important so the driver knows how to provide the gear control input and correctly control the gear of the transmission 112.

Figure 3:
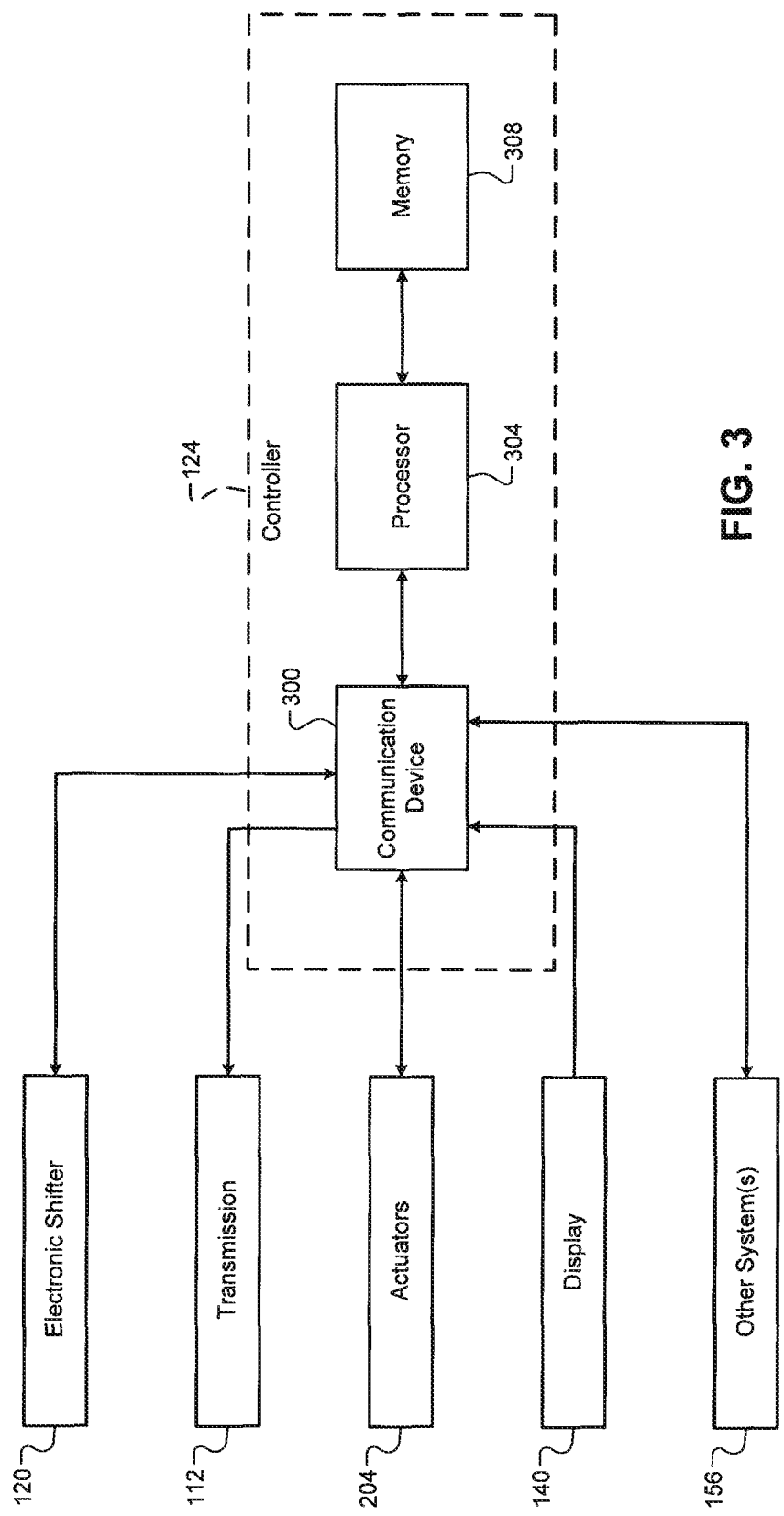
FIG. 3 is an example functional block diagram of a controller according to the principles of the present disclosure.

Referring now to FIG. 3, an example functional block diagram of the controller 124 is illustrated. The controller 124 includes a communication device 300, a processor 304, and a memory 308. The communication device 300 includes any suitable components (e.g., a transceiver) configured for communication with other components of the vehicle 100 via a controller area network. The processor 304 controls operation of the controller 124 and is configured to implement at least a portion of the vehicle limp-home techniques, as discussed herein. It will be appreciated that the term "processor" as used herein refers to both a single processor and two or more processors operating in a parallel or distributed architecture. The memory 308 is any suitable storage medium (flash, hard disk, etc.) configured to store information at the controller 124.

Figure 4:
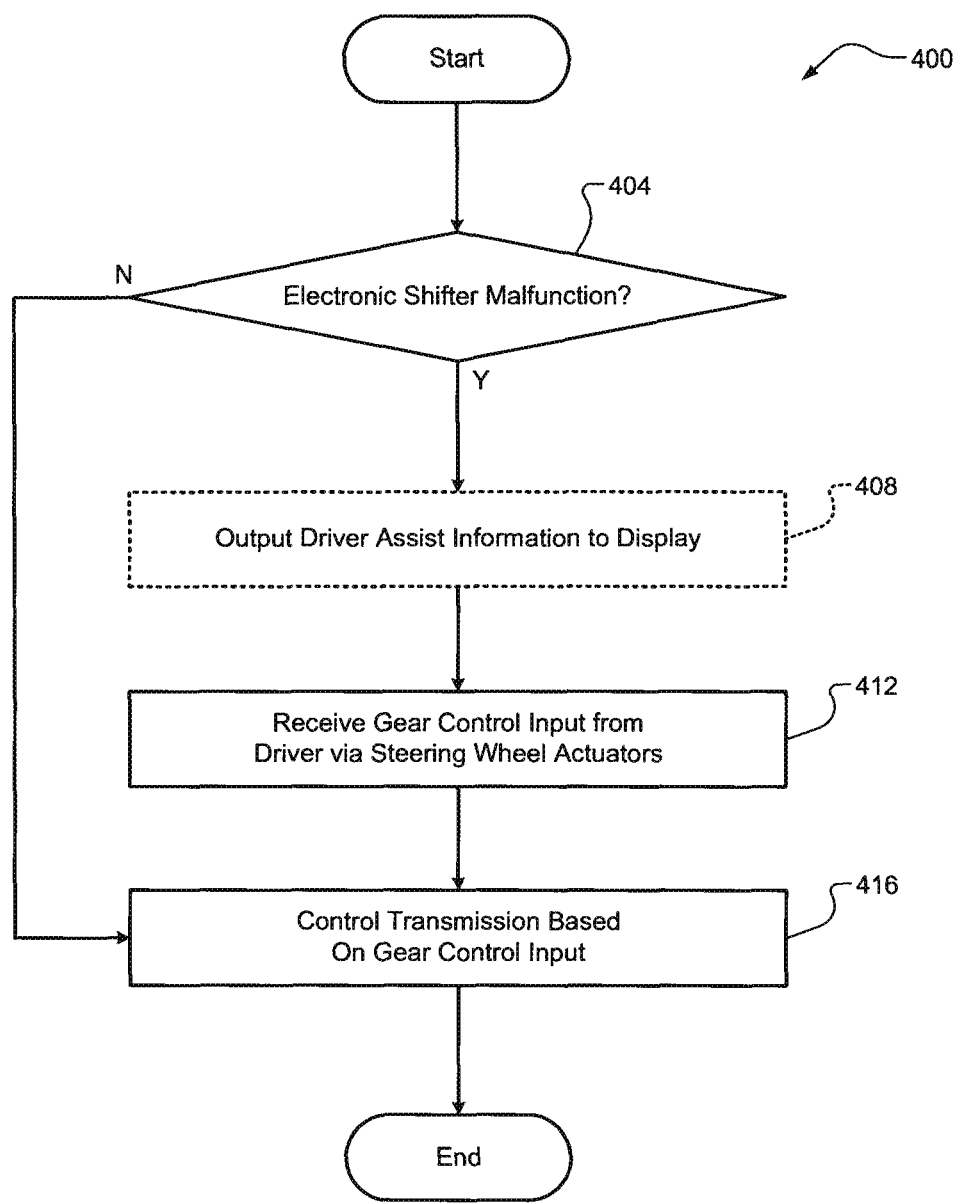
FIG. 4 is an example flow diagram of an example method for vehicle limp-home operation in response to an electronic shifter malfunction according to the principles of the present disclosure.

Referring now to FIG. 4, an example flow diagram of a method 400 for vehicle limp-home operation in response to an electronic shifter malfunction is illustrated. At 404, the controller 124 determines whether a malfunction of the electronic shifter 120 is detected. In one exemplary implementation, the malfunction of the electronic shifter 120 is detected when there is a loss of communication between the controller 124 and the electronic shifter 120. If the malfunction of the electronic shifter 120 is detected, the method 400 proceeds to 408. If the malfunction of the electronic shifter 120 is not detected, the driver is able to provide the gear control input via the electronic shifter 120 and the method proceeds to 416. At 408, the controller 124 optionally outputs the driver assist information to the display 140. At 412, the controller 124 receives the gear control input from the driver via the actuators 204 of the steering wheel 136. At 416, the controller 124 controls the gear of the transmission 112 in response to the gear control input. The method 400 then ends or returns to 404 for one or more additional cycles.

It should be understood that the mixing and matching of features, elements, methodologies and/or functions between various examples could be expressly contemplated herein so that one skilled in the art would appreciate from the present teachings that features, elements and/or functions of one example could be incorporated into another example as appropriate, unless described otherwise above.

What is claimed is:

1. A vehicle, comprising:
   an electronic shifter configured to electronically control shifting of a transmission in response to a gear control input provided by operation of the electronic shifter;
   a steering wheel (i) configured to control steering of the vehicle and (ii) having one or more actuators associated with one or more vehicle systems other than the transmission in a non-malfunction state of the electronic shifter;
   a display configured to display information; and
   a controller configured to:
      detect a malfunction of the electronic shifter,
      in response to detecting the malfunction of the electronic shifter:
         (i) control the display to output driver assist information that is adapted to instruct a driver of the vehicle in providing the gear control input via the one or more actuators of the steering wheel, the driver assist information including (a) a current gear of the transmission and (b) how the one or more actuators of the steering wheel are configured to control various gears of the transmission; and
         (ii) after the display outputs the driver assist information, receive the gear control input from the one or more actuators of the steering wheel, and
      control shifting of the transmission in response to the gear control input received from the one or more actuators of the steering wheel.

2. The vehicle of claim 1, wherein the controller detects the malfunction of the electronic shifter in response to detecting a loss of communication between the controller and the electronic shifter.

3. The vehicle of claim 1, wherein the display is an in-dash display.

4. The vehicle of claim 1, wherein the controller is further configured to override the association of the one or more actuators with the one or more vehicle systems other than the transmission upon detecting the malfunction of the electronic shifter.

5. The vehicle of claim 4, wherein the one or more vehicle systems includes an infotainment system of the vehicle.

6. The vehicle of claim 1, wherein the display is a center console display.

7. A method, comprising:
   detecting, at a controller of a vehicle, a malfunction of an electronic shifter of the vehicle, the electronic shifter being configured to control shifting of a transmission of the vehicle in response to a gear control input provided by operation of the electronic shifter;
   in response to detecting the malfunction of the electronic shifter:
      (i) controlling, by the controller, an interior display of the vehicle to output driver assist information that is adapted to instruct a driver of the vehicle in providing the gear control input via one or more actuators of a steering wheel of the vehicle, the driver assist information including (a) a current gear of the transmission and (b) how the one or more actuators of the steering wheel are configured to control various gears of the transmission, and the one or more actuators being associated with one or more vehicle systems other than the transmission in a non-malfunction state of the electronic shifter; and (ii) after the interior display outputs the driver assist information, receiving, at the controller, the gear control input from the one or more actuators of the steering wheel; and controlling, by the controller, shifting of the transmission in response to the gear control input received from the one or more actuators of the steering wheel.

8. The method of claim 7, wherein detecting the malfunction of the electronic shifter includes detecting, at the controller, the malfunction of the electronic shifter when there is a loss of communication detected between the controller and the electronic shifter.

9. The method of claim 7, wherein the interior display is an in-dash display.

10. The method of claim 7, further comprising overriding, by the controller, the association of the one or more actuators with the one or more vehicle systems other than the transmission upon detecting the malfunction of the electronic shifter.

11. The method of claim 10, wherein the one or more vehicle systems includes an infotainment system of the vehicle.

12. The method of claim 7, wherein the interior display is a center console display.

\* \* \* \* \*